United States Patent
Kontorinis et al.

(10) Patent No.: US 12,517,482 B2
(45) Date of Patent: Jan. 6, 2026

(54) POWER MANAGEMENT WITH DYNAMIC RECTIFIER APPORTIONMENT

(71) Applicant: Google LLC, Mountain View, CA (US)

(72) Inventors: Vasileios Kontorinis, Mountain View, CA (US); Peter Eldridge Bailey, Altadena, CA (US); Dustin Reishus, Sunnyvale, CA (US); Claus Congcui Zheng, Sunnyvale, CA (US); Alejandro Lameda Lopez, Austin, TX (US)

(73) Assignee: Google LLC, Mountain View, CA (US)

( * ) Notice: Subject to any disclaimer, the term of this patent is extended or adjusted under 35 U.S.C. 154(b) by 481 days.

(21) Appl. No.: 17/891,255

(22) Filed: Aug. 19, 2022

(65) Prior Publication Data
US 2024/0094692 A1   Mar. 21, 2024

(51) Int. Cl.
*G05B 19/042* (2006.01)
*H02J 3/46* (2006.01)

(52) U.S. Cl.
CPC .............. *G05B 19/042* (2013.01); *H02J 3/46* (2013.01); *G05B 2219/2639* (2013.01)

(58) Field of Classification Search
CPC ........................................................ H02J 3/46
See application file for complete search history.

(56) References Cited

U.S. PATENT DOCUMENTS

| | | |
|---|---|---|
| 6,768,617 B2 | 7/2004 | Marr |
| 7,526,660 B2 | 4/2009 | Thaker et al. |
| 9,218,033 B1 | 12/2015 | Roy et al. |
| 9,489,003 B1 * | 11/2016 | O Sullivan ............... G05F 1/66 |
| 9,640,992 B1 | 5/2017 | Nay et al. |
| 9,712,080 B2 * | 7/2017 | Phadke ................... H02J 1/102 |
| 9,806,560 B2 | 10/2017 | Navarro |
| 9,886,658 B1 * | 2/2018 | Stanford .......... G06K 19/07786 |
| 10,585,468 B2 | 3/2020 | Sharma et al. |

(Continued)

OTHER PUBLICATIONS

Mark Murrill and B.J. Sonnenberg, Emerson Network Power, "Evaluating the Opportunity for DC Power in the Data Center" 2010 [<https://www.vertiv.com/globalassets/products/critical-power/dc-power-systems/dc-power-white-paper.pdf>] 10 pages.

(Continued)

*Primary Examiner* — Nathan L Laughlin
(74) *Attorney, Agent, or Firm* — Lerner David LLP

(57) ABSTRACT

The present disclosure provides for dynamically deactivating rectifiers to force remaining rectifiers to operate at or near their peak power efficiency. Rectifiers, for example rectifiers on racks of a data center, may operate according to an efficiency curve, based on its current load. Instead of distributing an AC power load across more rectifiers that operate sub-optimally on their efficiency curve, aspects of the disclosure provide for automatically deactivating some rectifiers by lowering voltage set-points. As power load to a rack decreases, the voltage of the current to a rectifier with a reduced voltage set-point falls below the set-point and turns off. Power is automatically redistributed to the remaining active rectifiers. The redistribution increases the power load onto the remaining rectifiers, allowing the rectifiers to perform more efficiently in converting AC power to DC power.

20 Claims, 6 Drawing Sheets

(56) References Cited

U.S. PATENT DOCUMENTS

| | | |
|---|---|---|
| 10,770,966 B2 | 9/2020 | Marcinkiewicz et al. |
| 10,938,249 B2 | 3/2021 | Arnitz et al. |
| 11,264,803 B1 | 3/2022 | Kontorinis et al. |
| 2004/0008456 A1* | 1/2004 | Canova .................. H02J 1/102 361/18 |
| 2004/0053093 A1* | 3/2004 | Colborn ............ H01M 8/04925 429/430 |
| 2006/0082222 A1 | 4/2006 | Pincu et al. |
| 2008/0232141 A1* | 9/2008 | Artusi ............... H02M 3/33592 363/21.01 |
| 2008/0320322 A1 | 12/2008 | Green et al. |
| 2015/0115711 A1 | 4/2015 | Kouroussis et al. |
| 2015/0171663 A1 | 6/2015 | Krstic et al. |
| 2017/0047744 A1* | 2/2017 | Kim .................... H02M 1/4225 |

OTHER PUBLICATIONS

Denis Blouin, Exploring Dual-Power Feeds in Data Centers, May 17, 2018 [<https://www.belden.com/blogs/data-center/exploring-dual-power-feeds-in-data-centers>] 2 pages.

Multi-Unit Controller for Rectifiers | Dynapower [Retrieved Aug. 10, 2022] [<https://dynapower.com/products/rectifier/multi-unit-controller/>] 13 pages.

Meisner, D., Gold, B. T., and Wenisch, T. F. 2011. The PowerNap server architecture. ACM Trans. Comput. Syst. 29, 1, Article 3 (Feb. 2011), 24 pages. DOI = 10.1145/1925109.1925112 http://doi.acm.org/10.1145/1925109.1925112.

Extended European search report for European Appl. No. 23173340.3 dated Feb. 22, 2024. 7 pages.

* cited by examiner

400

POWER MANAGEMENT WITH DYNAMIC RECTIFIER APPORTIONMENT

BACKGROUND

Data centers implement server racks ("racks") that transform AC to DC power with the use of rectifiers. Data centers use three-phase AC power to distribute power on the data floor in order to minimize power losses. A rectifier is a device for converting AC power to DC power. A rectifier can operate with various levels of efficiency in AC-to-DC conversion, depending on its current load or power draw. A voltage set point for a rectifier is the DC voltage at which the rectifier will operate while converting AC to DC power.

A rack is provisioned with a number of rectifiers for the rack's worst load case, for example when all devices connected to the rack are drawing a large amount of power simultaneously. As a result, these rectifiers are often idle outside of the worst-case load scenario for the rack, wasting energy. The situation is worse for dual-powered racks, where separate sets of rectifiers are used for both power sources to the rack. Under dual-powered racks, rectifiers are often guaranteed to operate at less than fifty percent load, a region where efficiency decreases quickly.

BRIEF SUMMARY

The present disclosure provides for dynamically deactivating rectifiers to force remaining rectifiers to operate at or near their peak power efficiency. A rectifier, for example a rectifier on a rack of a data center, may operate according to an efficiency curve, based on its current load. Instead of distributing an AC power load across more rectifiers that operate sub-optimally on their efficiency curve, aspects of the disclosure provide for automatically deactivating some rectifiers by lowering voltage set-points. By lowering the output voltage of a given rectifier, the given rectifier will stop sourcing current into a DC load as long as other rectifiers are able to maintain a DC output voltage higher than the given rectifier's setpoint. The redistribution increases the power load onto the remaining rectifiers, allowing the rectifiers to perform more efficiently in converting AC power to DC power.

A controller can be implemented to receive telemetry data from the rectifiers and determine whether or not to reset the voltage set-point as power draw increases on the server racks. When the voltage set-point is reduced, the rectifier is automatically deactivated when falling below the set voltage, without further signals provided by the controller. As a result, the rectifiers can be dynamically apportioned in real-time, without waiting for a control loop on the controller to intervene to reapportion the rectifiers based on load.

One aspect of the disclosure provides a system. The system includes a plurality of rectifiers; and one or more processors configured to receive data corresponding to a power output for the plurality of rectifiers; and reduce, based on the received data, a respective voltage set-point for one or more of the plurality of rectifiers until remaining un-reduced rectifiers operate within a threshold range of power efficiency.

Another aspect of the disclosure provides for a method. The method including receiving, by one or more processors, data corresponding to a power output for a plurality of rectifiers; and reducing, by the one or more processors and based on the received data, a respective voltage set-point for one or more of the plurality of rectifiers until remaining un-reduced rectifiers operate within a threshold range of power efficiency.

Another aspect of the disclosure provides for one or more non-transitory computer-readable storage media that are operable, when executed by one or more processors, to cause the one or more processors to perform operations including: receiving data corresponding to a power output for a plurality of rectifiers; and reducing, based on the received data, a respective voltage set-point for one or more of the plurality of rectifiers until remaining un-reduced rectifiers operate within a threshold range of power efficiency.

The above and other aspects of the disclosure can include one or more of the following features. In some examples, aspects of the disclosure provide for all of the following features, in combination.

In reducing the respective voltage set-point for one or more of the plurality of rectifiers, the one or more processors are further configured to: determine that at least a portion of the plurality of rectifiers are outputting power at a respective rate within a first threshold of one another; and based on the determination, reduce the respective voltage set-point for the one or more rectifiers outputting power at the respective rate within the first threshold of one another.

In some examples, each of the plurality of rectifiers are configured to receive a respective phase of current from a three-phase alternating current, and wherein in reducing the respective voltage set-point for at least one of the rectifiers outputting power at the respective rate within the first threshold of one another, the one or more processors are configured to select one or more rectifiers for voltage set-point reduction based on balancing the receipt of current by the plurality of rectifiers for each phase of the three-phase alternating current.

In some examples, the plurality of rectifiers form part of a server rack of a data center. In some examples, the rack is either a single-feed rack or a dual-feed rack.

In some examples, the one or more processors are further configured to: receive updated data corresponding to the power output for the plurality of rectifiers; and reset, based on the received updated data, the respective voltage set-point for at least one rectifier with a reduced voltage set-point.

In some examples, each rectifier of the plurality of rectifiers is configured to output power within a predetermined range of a respective voltage set-point; wherein rectifiers with higher respective voltage set-points are configured to output power before rectifiers with lower respective voltage set-points; and wherein a rectifier with a lower respective voltage set-point is configured to output power in response to a rectifier with a higher respective voltage set-point exceeding the predetermined range.

DETAILED DESCRIPTION

Figure 1A:
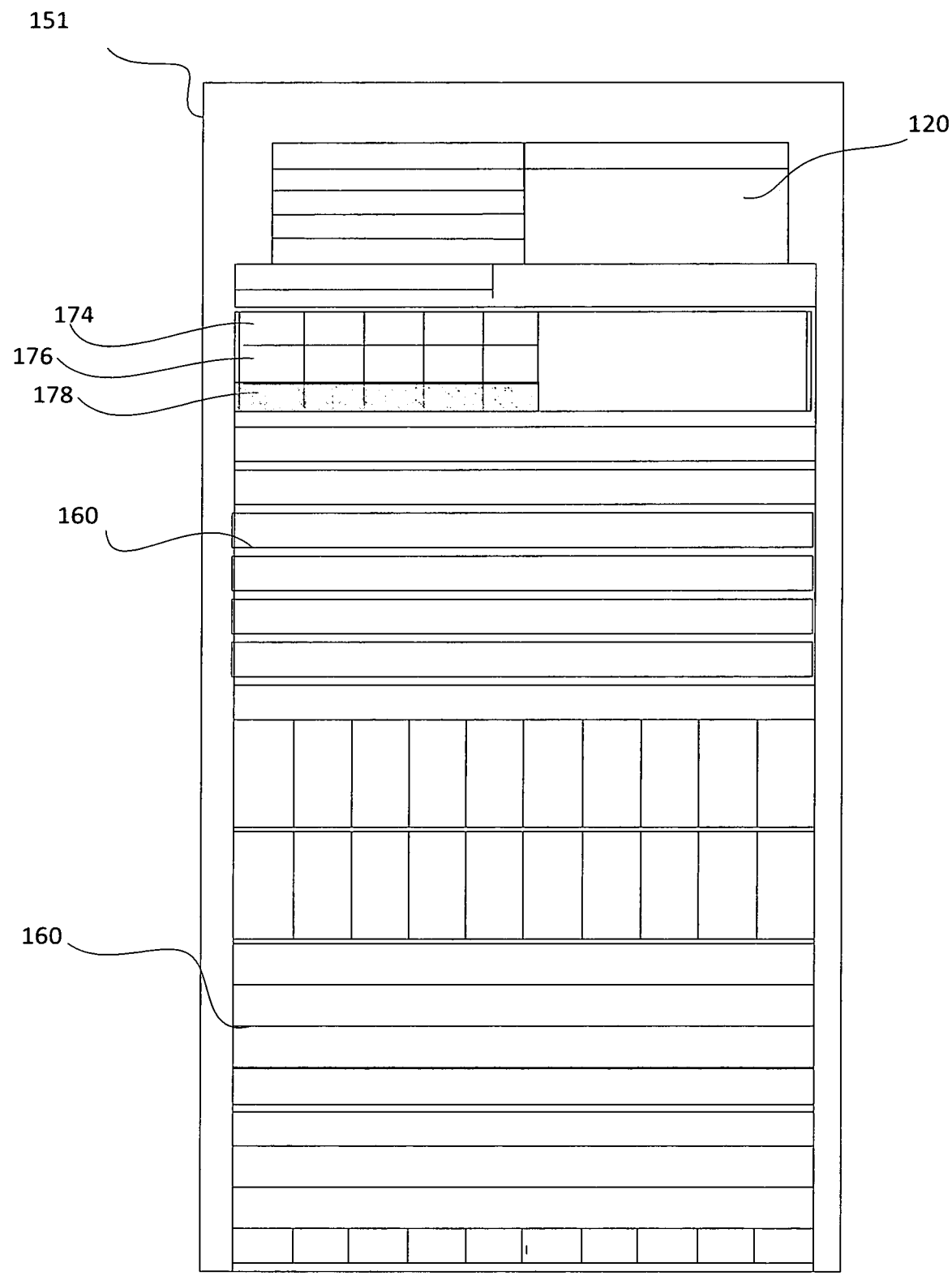
FIG. 1A illustrates an example rack including a plurality of rectifiers according to aspects of the disclosure.

FIG. 1A illustrates an example rack 151 including a plurality of rectifiers 174, 176, 178. As shown in this example, rectifier 178 is deactivated, while rectifiers 174, 176 are active. By deactivating the rectifier 178, active rectifiers 174, 176 can operate close to a peak of their power efficiency.

Deactivating the rectifier 178 may include lowering a voltage setpoint on the rectifier 178. Determination of when to dynamically activate one or more rectifiers and which rectifiers to deactivate may be made by hardware monitoring unit 120, or by software executed by one or more controllers or other computing devices. For example, the hardware monitoring unit 120 can run a control loop algorithm that reads telemetry. The telemetry may include, for example, voltage, current, power, fault status, or other signals output by the rectifiers. Such telemetry signals may be read by, for example, the hardware monitoring unit 120 or by software over a network. The control loop calculates the number of rectifiers that are needed to support the load, and thus calculates the number of rectifiers that can be deactivated. The selection of which rectifiers to deactivate can be random, proscribed by a deterministic process, or subject to an optimization scheme. There may also be additional constraints, for instance to balance power phases or wear-leveling on rectifier components. The control loop sends rectifier controls to lower the voltage setpoint on selected rectifiers.

Figure 1B:
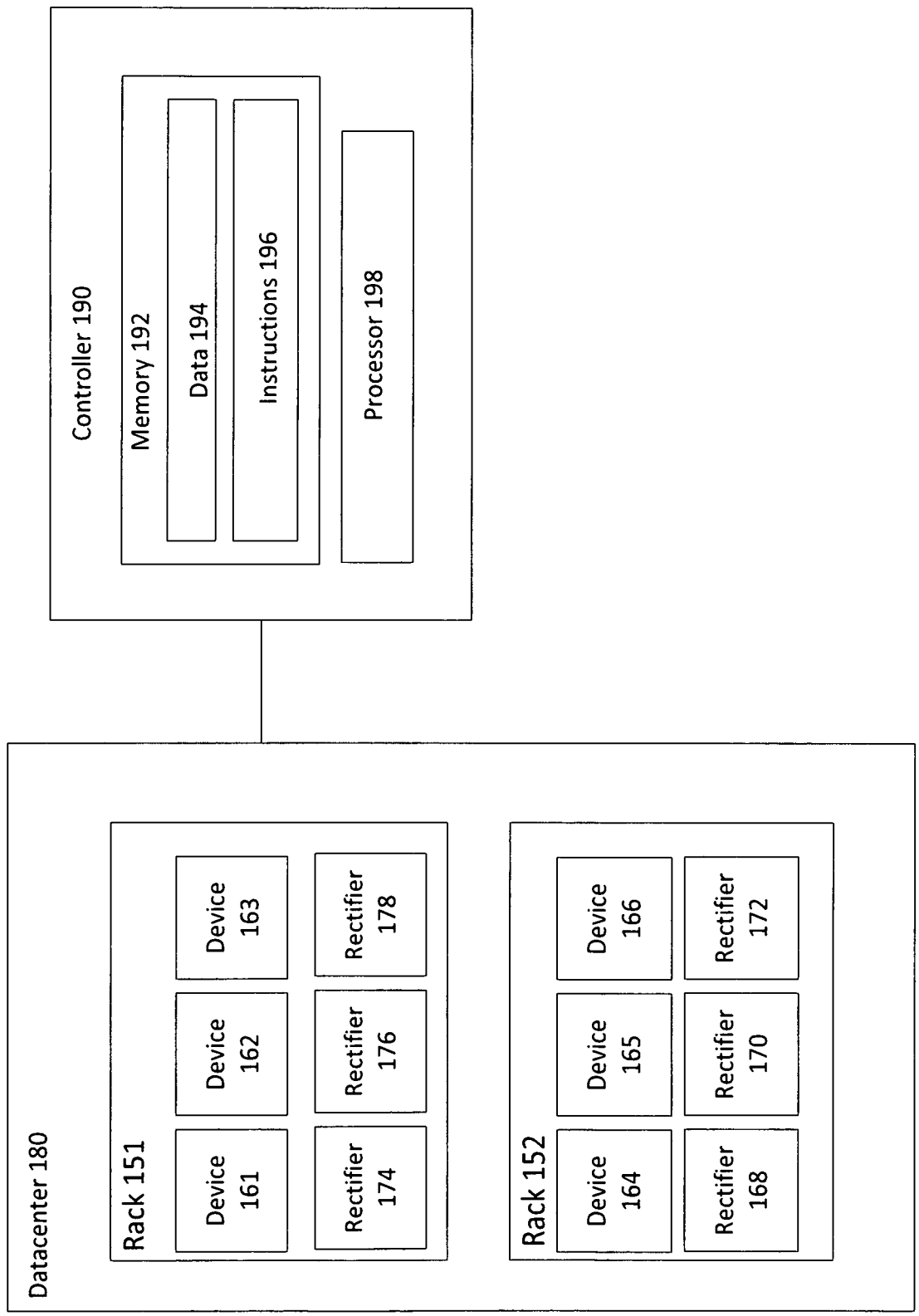
FIG. 1B is a block diagram of an example system according to aspects of the disclosure.

FIG. 1B illustrates an example system including a computing device, such as controller 190, on which the system may be implemented. The controller 190 may include hardware configured to receive telemetry data from rectifiers 168-178 and adjust the voltage set-points for each of the rectifiers in the data center 180. According to one example, the controller 190 may reside within and control a particular data center. According to other examples, the controller 190 may be coupled to one or more data centers 180, such as through a network, and may manage operations of multiple data centers. In some examples, the controller 190 may be implemented as part of rack 151 and/or rack 152. Although rectifiers 168-178 are shown, it is understood that any devices configured for converting power may be used, and aspects of the disclosure are not limited to AC to DC conversion, only.

The data center 180 may be positioned a considerable distance from the controller 190 and/or other data centers (not shown). The data center 180 may include one or more computing devices, such as processors, servers, shards, cells, or the like. For example, one or more racks 151, 152 may be coupled to a bus, each rack 151, 152 including a plurality of devices 161-166, such as server devices. Examples of data center computing devices are further described below in connection with FIGS. 2A-B. In some examples, the computing devices in the data center may have different capacities. For example, the different computing devices may have different processing speeds, workloads, etc. While only a few of these racks 151, 152, computing devices 161-166, and rectifiers 168-178 are shown, it should be understood that each data center 180 may include any number of computing devices, and that the number of computing devices in a first data center may differ from a number of computing devices in a second data center. Similarly, the number of computing devices in each rack may differ. Moreover, it should be understood that the number of computing devices 161-166, rectifiers 168-178, and racks 151, 152 in each data center 180 may vary over time, for example, as hardware is removed, replaced, upgraded, or expanded.

For example, racks 151, 152 may be single-feed or dual-feed racks, meaning that the racks 151, 152 may have one or two sources of power. For each power source, a rack may have a set of rectifiers for converting received AC power to DC power.

In some examples, the controller 190 may communicate with the computing devices in the data center 180 and may facilitate the execution of programs. For example, the controller 190 may track the capacity, status, workload, or other information of each computing device, and use such information to assign tasks. The controller 190 may include a processor 198 and memory 192, including data 194 and instructions 196. In other examples, such operations may be performed by one or more of the computing devices in the data center 180, and an independent controller may be omitted from the system.

The controller 190 may contain a processor 198, memory 192, and other components typically present in server computing devices. The memory 192 can store information accessible by the processor 198, including instructions 196 that can be executed by the processor 198. Memory can also include data 194 that can be retrieved, manipulated, or stored by the processor 198. The memory 192 may be a type of non-transitory computer readable medium capable of storing information accessible by the processor 198, such as a hard-drive, solid state drive, tape drive, optical storage, memory card, ROM, RAM, DVD, CD-ROM, write-capable, and read-only memories. The processor 198 can be a well-known processor or other lesser-known types of processors. Alternatively, the processor 198 can be a dedicated controller such as an ASIC.

The instructions 196 can be a set of instructions executed directly, such as machine code, or indirectly, such as scripts, by the processor 198. In this regard, the terms "instructions," "steps" and "programs" can be used interchangeably herein. The instructions 196 can be stored in object code format for direct processing by the processor 198, or other types of computer language including scripts or collections of independent source code modules that are interpreted on demand or compiled in advance.

The data 194 can be retrieved, stored, or modified by the processor 198 in accordance with the instructions 196. For instance, although the system and method are not limited by a particular data structure, the data 194 can be stored in computer registers, in a relational database as a table having a plurality of different fields and records, or XML documents. The data 194 can also be formatted in a computer-readable format such as, but not limited to, binary values, ASCII, or Unicode. Moreover, the data 194 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 198 and memory 192 as being within the same block, the processor 198 and memory 192 may actually include multiple processors and memories that may or may not be stored within the same physical housing. For example, some of the instructions 196 and data 194 can be stored on a removable CD-ROM and others within a read-only computer chip.

Some or all of the instructions and data can be stored in a location physically remote from, yet still accessible by, the processor 198. Similarly, the processor 198 can actually include a collection of processors, which may or may not operate in parallel.

Figure 2A:
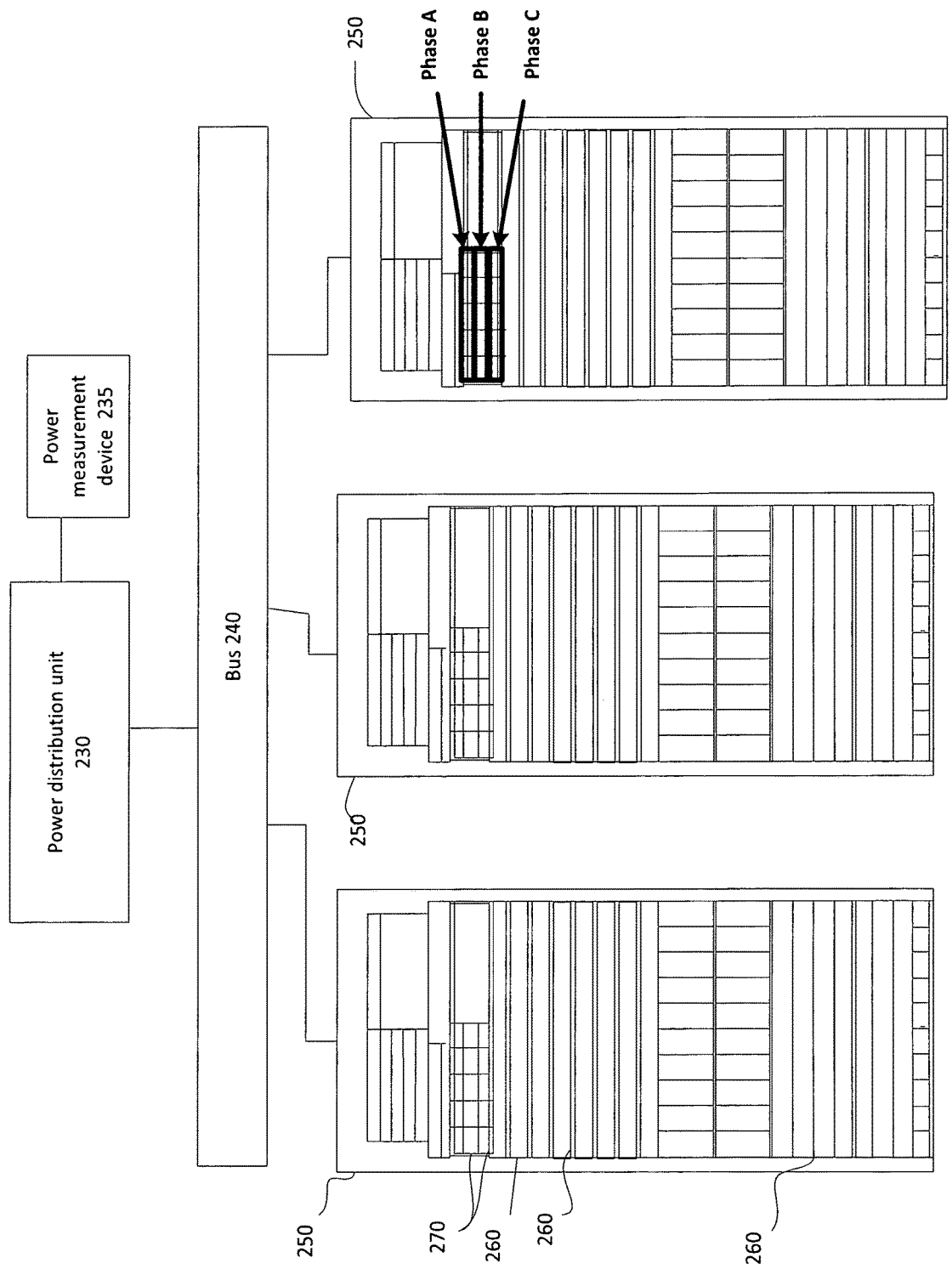
FIGS. 2A-B are schematic diagrams illustrating example data centers according to aspects of the disclosure.

FIG. 2A provides one example of a data center, including a plurality of racks 250 of a first type. For example, such racks 250 of the first type may be used by hyperscale providers. Each rack includes a plurality of machines 260, such as servers or other processing devices. Additionally, each rack 250 includes a plurality of rectifiers 270 deployed across different phases. For example, the rectifiers 270 may be deployed across Phase A, B, and C. The rectifiers 270 rectify AC current into DC current that powers the machines 260. For example, a DC power bus (not shown) may run along a back of the rack and connect the rectifiers 270 to the machines 260.

The rectifiers 270 may receive the AC current from a bus 240, wherein multiple racks 250 may be coupled to the bus 240. While three racks 250 are shown in FIG. 2A, it should be understood that more or fewer racks may be coupled to the bus 240.

The bus 240 receives power from power distribution unit 230, which may be further coupled to a power source (not shown). For example, a power signal delivered to the bus 240 through the power distribution unit 230 may be a three-phase signal. While only one bus 240 is shown connected to the power distribution unit 230, it should be understood that multiple buses may be coupled to each power distribution unit, each bus having a plurality of racks coupled thereto.

Measuring device 235 may be coupled to, or included in, the power distribution unit 230. The measuring device 235 may measure the load placed on the power signal by the equipment in the racks 250. The measuring device 235 may be, for example, a wattage meter, an amp meter, or a voltmeter that measures a voltage across one or more phases of the signal. Data from the measuring device 235 can include telemetry data, which can be received by a controller, such as controller 190. The telemetry data can include the current load of each rectifier, from which the controller 190 can determine whether to reduce the voltage set-point, as described in more detail with reference to FIGS. 3-4.

Figure 2B:
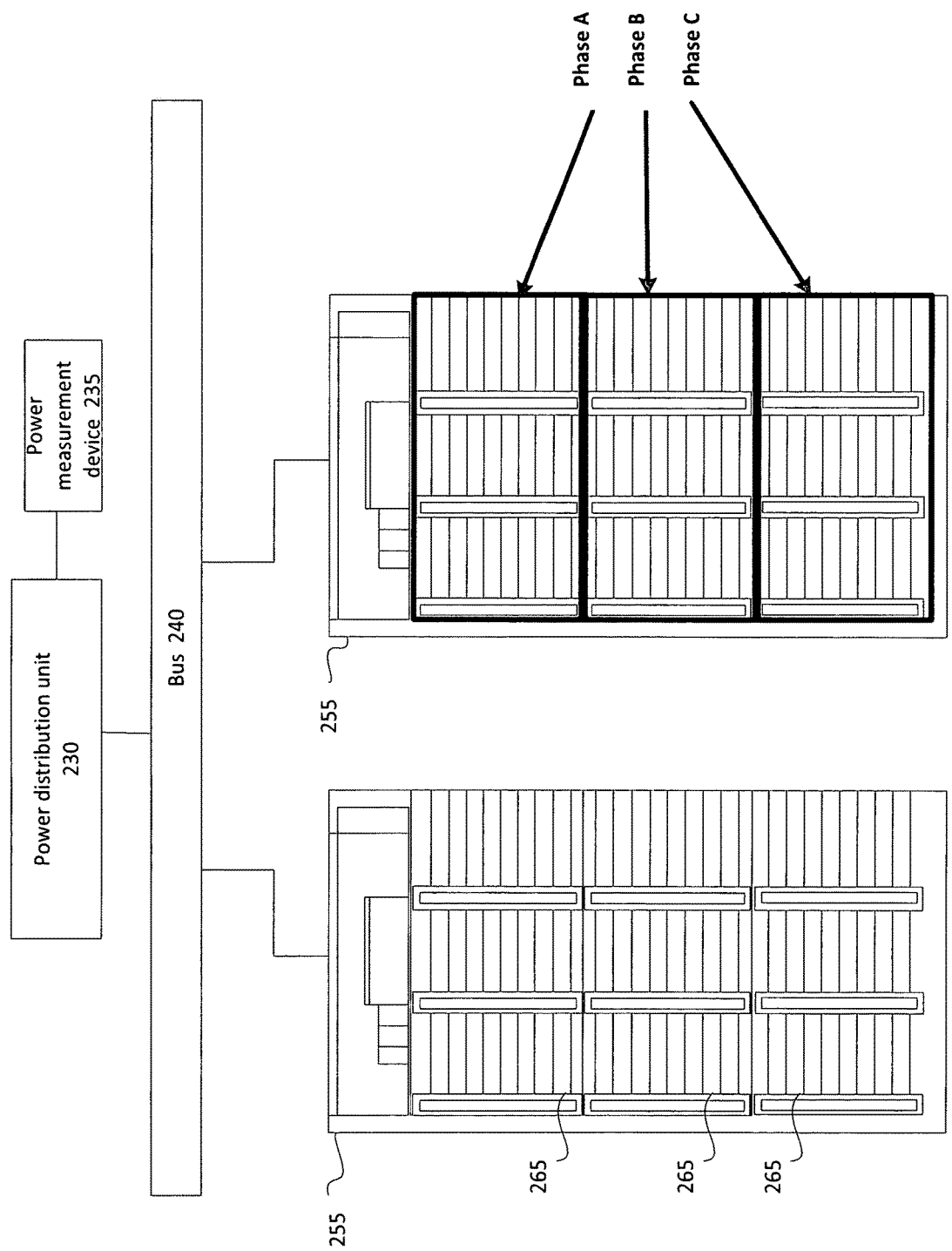

FIG. 2B illustrates another example data center, including a plurality of racks 255 coupled to bus 240, each rack 255 including a plurality of machines 265. The power distribution unit 230, measuring device 235, and bus 240 may operate similarly as described above in connection with FIG. 2A. In FIG. 2B, the racks 255 may be of a second type. For example, such rack types may be used in smaller data center deployments. Each machine 265 may draw power from a single phase. In this setup the location of the machine in the rack determines the phase from which it draws power. For example, the machines 265 located in an upper portion of the rack may draw power from Phase A, while the machines in the middle portion of the rack draw power from Phase B and the machines in the bottom portion of the rack draw power from Phase C. While only one two racks 255 and one bus 240 are shown in FIG. 2B, it should be understood that additional racks and buses may be coupled to the power distribution unit.

While FIGS. 1, 2A-B illustrate a number of data center components, it should be understood that the data center may include additional components. For example, the data center may further include switches, communication links such as optical link, wiring, or the like, telemetry systems, and/or other components typically found in data centers.

Moreover, while one power distribution unit 230 is shown in each figure, it should be understood that each data center may include multiple power distribution units, each having a subset of buses, racks, and components. For example, different power distribution units may service different portions of the data center. Each power distribution unit may be coupled to one or more processors or computing devices, such as the controller 190 of FIG. 1, for detecting and measuring and correcting current imbalance.

In either of the deployments of FIGS. 2A-B, or other example deployments, aspects of the disclosure provide for dynamic reapportionment of rectifiers, for example according to processes 300 and/or 400, described presently.

Figure 3:
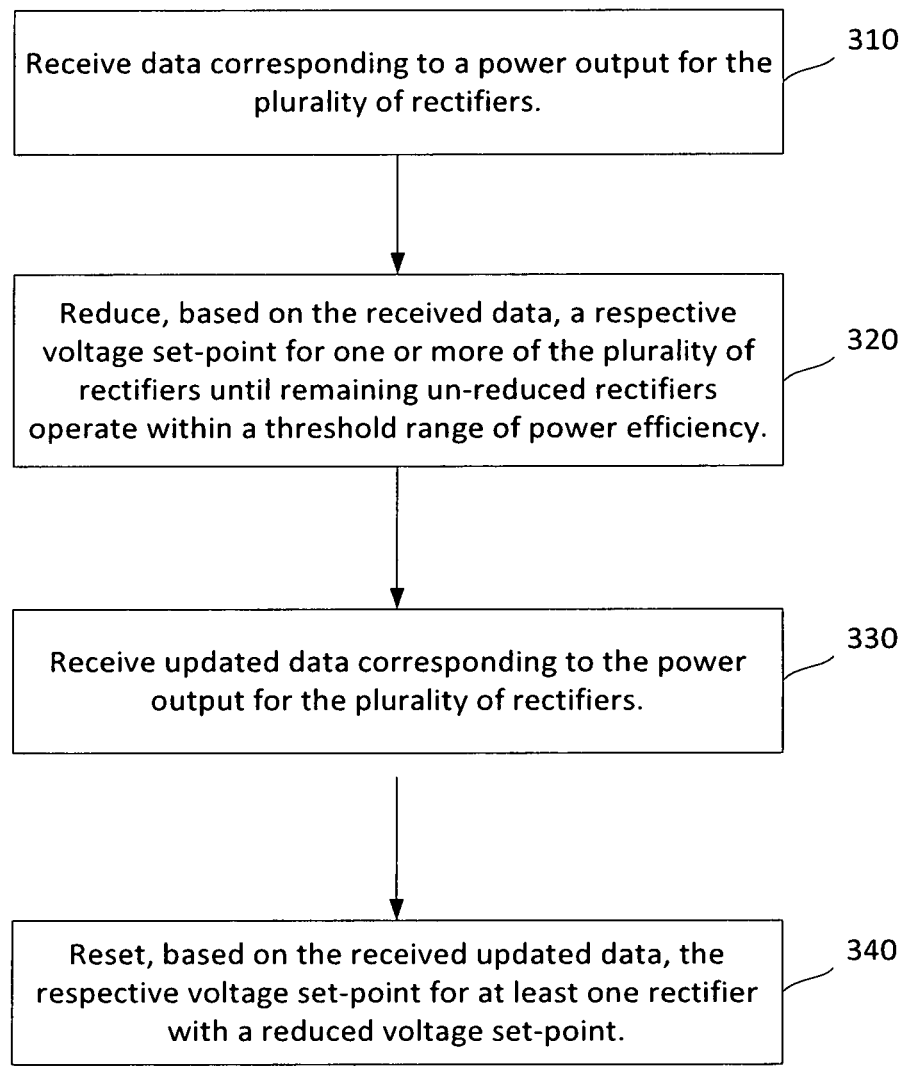
FIG. 3 is a flow diagram of an example process for dynamic reapportionment of rectifiers by adjusting voltage set-points, according to aspects of the disclosure.

FIG. 3 is a flow diagram of an example process for dynamic reapportionment of rectifiers by adjusting voltage set-points, according to aspects of the disclosure.

According to block 310, a controller can receive data corresponding to a power output for a plurality of rectifiers. The data can be telemetry data received by the controller from the rectifiers. The rectifiers can be included in a server rack of a data center. In some examples, the racks or data center as a whole can be single-feed or dual-feed. In a dual-feed rack, each source of power can include separate sets of rectifiers. Each rectifier can be configured to output power at or within a predetermined range of a respective voltage set-point According to block 320, the controller can reduce, based on the received data, a respective voltage set-point for one or more of the plurality of rectifiers until remaining un-reduced rectifiers operate within a threshold range of power efficiency. The controller can receive predetermined power efficiency data for each rectifier. The power efficiency data can be a curve representing the rate of converted DC power of a rectifier given a certain input rate of AC power. Efficiency in this context can be measured, for example, based on the amount of lost power converted, where less power lost correlates to higher efficiency.

The threshold range can be a range along the efficiency curve for rectifiers whose voltage set-points are not reduced, such that the un-reduced rectifiers operate at or near their peak efficiency when operating within the range. The threshold range can be predetermined, for example from data provided by the manufacturer of the rectifier, and/or empirically determined before or while the rectifier is deployed, as examples.

To determine which rectifiers to reduce, the controller can select from a ranked or predetermined list of rectifiers to select for reduction, in some examples. For example, rectifiers 1 through N on a server rack may be shut down in ascending or descending order. In some examples, the rectifiers selected for reduction are chosen randomly. In other examples, the rectifiers are shut down in order of descending efficiency, e.g., shut down the rectifiers predetermined to be less efficient, before shutting down more efficient rectifiers.

To determine the number of rectifiers to reduce, the controller can first determine that a predetermined threshold number of rectifiers are not operating at or within a respective efficiency range, for one or more of the rectifiers. If so, the controller can begin to reduce the voltage set-point to one or more rectifiers, until the remaining rectifiers begin to operate within their respective efficiency ranges.

In some examples, the rectifiers are configured to receive a respective phase of current from a three-phase alternating current. The controller can select which rectifiers to deactivate based on balancing the receipt of current by the plurality of rectifiers, for each phase of the three-phase alternating current. For example, the controller will reduce one rectifier set to phase A, one rectifier set to phase B, and one rectifier set to phase C, before reducing multiple rectifiers from the same phase.

Rectifiers with higher respective voltage set-points are configured to output power before rectifiers with lower respective voltage set-points. The phase balancing might occur at the rack level, or it might happen across several racks connected to the same power source. Rectifiers with a lower respective voltage set-point are configured to output power in response to a rectifier with a higher respective voltage set-point exceeding the predetermined range. In some examples, a predetermined number of rectifiers are selected for reduction, e.g., the minimal number of rectifiers required in order to support the measured electrical load in the rack.

After determining which rectifiers to reduce and how many rectifiers to reduce, the controller can send a control signal to each of the selected rectifiers. The control signal can cause the rectifier to reduce its voltage set-point, e.g., from 54.5V to 53.5V. By reducing the voltage set-point, the reduced rectifiers are set to automatically shut off when the power draw of the corresponding rack is low enough such that the remaining rectifiers can supply sufficient current to support the electrical load at the original voltage set-point. As the rectifiers are connected together to the power source, the incoming AC power will be redistributed automatically to the remaining active (un-reduced) rectifiers.

The deactivation of the reduced rectifier can be automatic based on the electrical load in the rack. The controller does not need to intervene to deactivate the rectifier, e.g., by a control signal. In this way, the reapportionment of the rectifiers in response to changing power draw to the rack can be performed quickly and more efficiently over waiting for a control loop cycle of the controller to probe the rack and determine whether to reduce one or more rectifiers.

According to block 330, the controller receives updated data corresponding to the power output for the plurality of rectifiers. The updated data can be additional telemetry data received from the rectifiers and/or server rack on which the rectifiers are connected. The updated data can quantify the current load for each of the active rectifiers and the number of total rectifiers (active and inactive).

According to block 340, the controller resets, based on the received updated data, the respective voltage set-point for at least one rectifier with a reduced voltage set-point. Resetting the voltage set-point can refer to returning the voltage set-point of the rectifier to the value it was at before it was reduced. In some examples, resetting the voltage set-point can refer to raising the voltage set-point from the reduced value. The AC power draw automatically redistributes to the newly reactivated rectifiers. The controller can perform some or all parts of the process 300 periodically, e.g., as part of a control loop. The control loop can occur every thirty seconds, for example.

Figure 4:
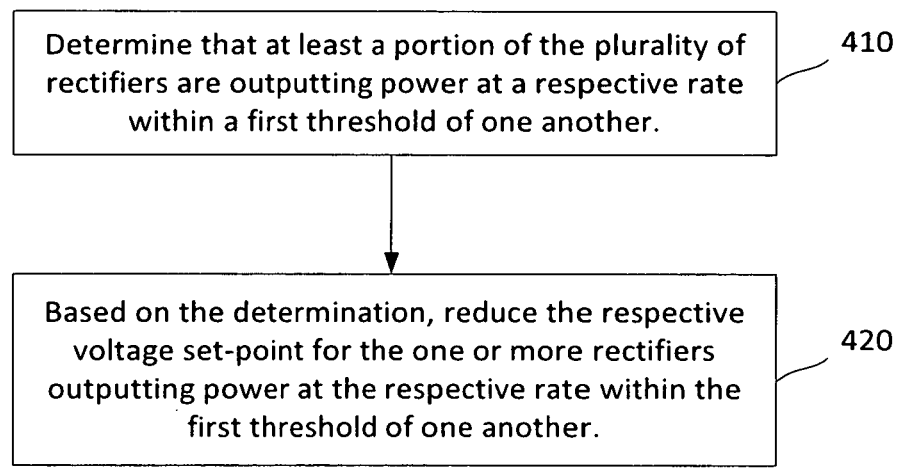
FIG. 4 is a flow diagram of an example process for reducing the voltage set-point of a rectifier, according to aspects of the disclosure.

FIG. 4 is a flow diagram of an example process 400 for reducing the voltage set-point of a rectifier, according to aspects of the disclosure. The controller determines that at least a portion of the plurality of rectifiers are outputting power at a respective rate within a threshold of one another, according to block 410. Based on the determination, the controller reduces the respective voltage set-point for the one or more rectifiers outputting power at the respective rate within the first threshold of one another, according to block 420. By identifying rectifiers within a threshold to each other, the controller determines that the rectifiers are evenly balanced in distribution, which may indicate that a configuration with fewer rectifiers operating at a higher draw is possible. The controller can reduce the set-points for some of the rectifiers, e.g., as described herein, to rectify the incoming AC power more efficiently with fewer rectifiers.

The system and method described above are advantageous in that vast amounts of power can be saved by rebalancing active rectifiers. Accordingly, data centers can run more efficiently. Moreover, by reapportioning rectifiers dynamically as described herein, power load can be redistributed without waiting for a control loop cycle, allowing rectifiers to operate closer to their peak efficiency curves. The effect is even more pronounced in dual-feed racks, as these types of racks typically implement more rectifiers than their single-feed counterparts and are thus more likely to result in idle rectifiers when not operating under its worst-case load.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system comprising:
   a plurality of rectifiers; and
   one or more processors configured to:
   receive data corresponding to a power output for the plurality of rectifiers; and
   reduce, based on the received data and on predetermined power efficiency data for the rectifiers, a respective voltage set-point for one or more of the plurality of rectifiers until remaining un-reduced rectifiers operate within a threshold range of power efficiency,
wherein reduction of the respective voltage set-point for one or more of the plurality of rectifiers is performed in descending order of inefficiency of the rectifiers, the inefficiency of each rectifier being determined based on received efficiency data for the rectifier, and the efficiency data for the rectifier indicating the rate of converted DC power of the rectifier given a certain input rate of AC power to the rectifier.

2. The system of claim 1, wherein in reducing the respective voltage set-point for one or more of the plurality of rectifiers, the one or more processors are further configured to:
determine that at least a portion of the plurality of rectifiers are outputting power at a respective rate within a first threshold of one another; and
based on the determination, reduce the respective voltage set-point for the one or more rectifiers outputting power at the respective rate within the first threshold of one another.

3. The system of claim 1,
wherein each of the plurality of rectifiers are configured to receive a respective phase of current from a three-phase alternating current, and
wherein in reducing the respective voltage set-point for at least one of the rectifiers outputting power at the respective rate within the first threshold of one another, the one or more processors are configured to select one or more rectifiers for voltage set-point reduction based on balancing the receipt of current by the plurality of rectifiers for each phase of the three-phase alternating current either at a rack level, or across several racks connected to the same power source.

4. The system of claim 1, wherein the plurality of rectifiers are rectifiers for a server rack of a data center.

5. The system of claim 4, wherein the rack is either a single-feed rack or a dual-feed rack.

6. The system of claim 1, wherein the one or more processors are further configured to:
receive updated data corresponding to the power output for the plurality of rectifiers; and
reset, based on the received updated data, the respective voltage set-point for at least one rectifier with a reduced voltage set-point.

7. The system of claim 1,
wherein each rectifier of the plurality of rectifiers is configured to output power within a predetermined range of a respective voltage set-point;
wherein rectifiers with higher respective voltage set-points are configured to output power before rectifiers with lower respective voltage set-points; and
wherein a rectifier with a lower respective voltage set-point is configured to output power in response to a rectifier with a higher respective voltage set-point exceeding the predetermined range.

8. A method comprising:
receiving, by one or more processors, data corresponding to a power output for a plurality of rectifiers; and
reducing, by the one or more processors and based on the received data and on predetermined power efficiency data for the rectifiers, a respective voltage set-point for one or more of the plurality of rectifiers until remaining un-reduced rectifiers operate within a threshold range of power efficiency,
wherein reduction of the respective voltage set-point for one or more of the plurality of rectifiers is performed in descending order of inefficiency of the rectifiers, the inefficiency of each rectifier being determined based on received efficiency data for the rectifier, and the efficiency data for the rectifier indicating the rate of converted DC power of the rectifier given a certain input rate of AC power to the rectifier.

9. The method of claim 8, wherein reducing the respective voltage set-point for one or more of the plurality of rectifiers comprises:
determining that at least a portion of the plurality of rectifiers are outputting power at a respective rate within a first threshold of one another; and
based on the determination, reducing the respective voltage set-point for the one or more rectifiers outputting power at the respective rate within the first threshold of one another.

10. The method of claim 8,
wherein each of the plurality of rectifiers are configured to receive a respective phase of current from a three-phase alternating current, and
wherein reducing the respective voltage set-point for at least one of the rectifiers outputting power at the respective rate within the first threshold of one another comprises selecting one or more rectifiers for voltage set-point reduction based on balancing the receipt of current by the plurality of rectifiers for each phase of the three-phase alternating current.

11. The method of claim 8, wherein the plurality of rectifiers are rectifiers for a server rack of a data center.

12. The method of claim 11, wherein the rack is either a single-feed rack or a dual-feed rack.

13. The method of claim 8, further comprising:
receiving updated data corresponding to the power output for the plurality of rectifiers; and
resetting, based on the received updated data, the respective voltage set-point for at least one rectifier with a reduced voltage set-point.

14. The method of claim 8,
wherein each rectifier of the plurality of rectifiers is configured to output power within a predetermined range of a respective voltage set-point;
wherein rectifiers with higher respective voltage set-points are configured to output power before rectifiers with lower respective voltage set-points; and
wherein a rectifier with a lower respective voltage set-point is configured to output power in response to a rectifier with a higher respective voltage set-point exceeding the predetermined range.

15. One or more non-transitory computer-readable storage media storing instructions that are operable, when executed by one or more processors, to cause the one or more processors to perform operations comprising:
receiving data corresponding to a power output for a plurality of rectifiers; and
reducing, based on the received data and on predetermined power efficiency data for the rectifiers, a respective voltage set-point for one or more of the plurality of rectifiers until remaining un-reduced rectifiers operate within a threshold range of power efficiency,
wherein reduction of the respective voltage set-point for one or more of the plurality of rectifiers is performed in descending order of inefficiency of the rectifiers, the inefficiency of each rectifier being determined based on received efficiency data for the rectifier, and the efficiency data for the rectifier indicating the rate of converted DC power of the rectifier given a certain input rate of AC power to the rectifier.

16. The computer-readable storage media of claim 15, wherein reducing the respective voltage set-point for one or more of the plurality of rectifiers comprises:
  determining that at least a portion of the plurality of rectifiers are outputting power at a respective rate within a first threshold of one another; and
  based on the determination, reducing the respective voltage set-point for the one or more rectifiers outputting power at the respective rate within the first threshold of one another.

17. The computer-readable storage media of claim 15,
  wherein each of the plurality of rectifiers are configured to receive a respective phase of current from a three-phase alternating current, and
  wherein reducing the respective voltage set-point for at least one of the rectifiers outputting power at the respective rate within the first threshold of one another comprises selecting one or more rectifiers for voltage set-point reduction based on balancing the receipt of current by the plurality of rectifiers for each phase of the three-phase alternating current.

18. The computer-readable storage media of claim 15, wherein the plurality of rectifiers are rectifiers for a server rack of a data center.

19. The computer-readable storage media of claim 18, wherein the rack is either a single-feed rack or a dual-feed rack.

20. The computer-readable storage media of claim 15, wherein the operations further comprise:
  receiving updated data corresponding to the power output for the plurality of rectifiers; and
  resetting, based on the received updated data, the respective voltage set-point for at least one rectifier with a reduced voltage set-point.

* * * * *